United States Patent [19]

Kato et al.

[11] Patent Number: 5,083,596
[45] Date of Patent: Jan. 28, 1992

[54] PRESSURIZED WITH A FLUID HAVING A SPECIFIC GRAVITY GREATER THAN AIR

[76] Inventors: Hiroshi Kato, 3-12-11, Tsubakimori, Chiba-shi, Chiba; Hiroatsu Nagata, 4-29-2-616, Koenji-kita, Suginami-ku, Tokyo; Tsutomu Katsura, Mure Heights 305, 1-5-14, Mure, Mitaka-shi, Tokyo; Hiroyuki Doe, 8-5, Matsunouchi-cho, Ashiya-shi, Hyogo; Kiichiro Sarui, 4-26-15, Takatanobaba, Shinjuku-ku, Tokyo, all of Japan

[21] Appl. No.: 437,580

[22] Filed: Nov. 17, 1989

[51] Int. Cl.$^5$ ............... B60C 19/00; B60C 23/18
[52] U.S. Cl. ............... 152/154.1; 152/153; 152/DIG. 5
[58] Field of Search ............... 152/415, 416, 417, 151, 152/152, 153, 154.1, 450, DIG. 5, 502–507, 521; 156/74, 75

[56] References Cited

U.S. PATENT DOCUMENTS

| | | | |
|---|---|---|---|
| 485,898 | 11/1892 | Sweeting | 152/DIG. 5 |
| 497,965 | 5/1893 | Owen | 152/DIG. 5 |
| 2,334,110 | 11/1943 | McMahan | 152/DIG. 5 |
| 2,343,838 | 3/1944 | Wilson | 152/DIG. 5 |
| 2,695,047 | 11/1954 | Ruck | 152/154.1 |
| 2,909,389 | 11/1954 | Wilborn | 152/154.1 |
| 3,230,999 | 1/1966 | Hicks | 152/450 |
| 3,312,265 | 4/1967 | Turner et al. | 152/450 |
| 3,453,210 | 7/1969 | Wright | 152/521 |
| 4,776,888 | 10/1988 | Morrow | 152/504 |
| 4,867,792 | 9/1989 | Ronlan | 152/154.1 |

FOREIGN PATENT DOCUMENTS

| | | | |
|---|---|---|---|
| 470647 | 9/1914 | France | 152/DIG. 5 |
| 578287 | 9/1924 | France | 152/DIG. 5 |
| 1180870 | 1/1959 | France | 152/DIG. 5 |
| 198620 | 6/1923 | United Kingdom | 152/DIG. 5 |

Primary Examiner—Michael W. Ball
Assistant Examiner—Gregory J. Wilber
Attorney, Agent, or Firm—Longacre & White

[57] ABSTRACT

A vehicle tire in which pressurized air is charged into an air tight inside of a tire together with from 5% to 95% by volume of a fluid having a specific gravity greater than that of air based on 100% by volume of the pressurized air and from 1% to 20% by weight of one or more of fine metals of metal oxide particles, uniformly dispersed in the fluid, based on 100% by weight of the fluid, the metal ingredient of the particles being selected from the group consisting of Al, Si, Ca, Ti, Mn, Fe, Co, Ni, Cu, Zn, Pb, Ba, Mg, and Mo.

Water is desirable as the fluid charged in the tire, and the highly water absorbing polymer swollen with water may be used instead of water. Running stability and the braking distance of a vehicle can be improved remarkably.

6 Claims, 1 Drawing Sheet

PRESSURIZED WITH A FLUID HAVING A SPECIFIC GRAVITY GREATER THAN AIR

BACKGROUND OF THE INVENTION

1. Field of the Invention

The present invention concerns a tire used for cars or like other vehicles and, more in particular, it relates to a tire capable of improving running stability and performance.

2. Description of the Prior Art

Tires used for vehicles such as cars are usually charged with pressurized air at the inside of an air tube contained in a tire or directly in an airtight plenum of a tire for absorbing shocks exerted from a road surface.

Further, such a pneumatic tire also has an important concern on the running stability and steering performance and they are controlled by adjusting the pressure of air charged in the tire. The tire also has a more important concern with a braking operation, in particular, emergency braking during high speed running of a car. It is highly desirable that a braking distance from the initiation of a braking operation till the complete stopping of the car is as short as possible from a safety point of view.

As far as a tire is concerned, the braking distance can be shortened, generally, by forming a grooved pattern of an appropriate design on a tread surface of a tire so as to increase a frictional resistance or ground gripping effect of the tire.

The grooved pattern formed on the tread can surely provide increased frictional resistance relative to the road surface, but it is not yet completely sufficient for providing satisfactory effect upon emergency braking. A car tire readily suffers from denaturation and deformation (abrasion) due to heat of friction generated between the tire and the load surface. Then, the grooved rubber tread is gradually made flat to lose its road gripping effect.

It has also been attempted recently to provide a rolled friction sheet adapted to be rapidly released upon emergency braking and spread between the tire and the road surface, thereby compulsorily forming anti-skid friction between them. However, use of the rolled frictional sheet may be reliable but it complicates the structure of a car.

SUMMARY OF THE PRESENT INVENTION

It is, accordingly, an object of the present invention to provide a vehicle tire capable of absorbing vibrations and impact shocks during running of a car and capable of improving running stability and performance.

Another and more practical object of the present invention is to provide a vehicle tire capable of remarkably shortening a braking distance, in particular, upon emergency braking of a car, thereby improving running safety of the car.

The foregoing objects of the present invention can be attained by a fluid-charged vehicle tire according to the present invention having features described below.

FIRST FEATURE OF THE INVENTION

A first feature of the present invention resides in:

A vehicle tire in which a pressurized air is charged in an air tight inside of a tire, together with
from 5% to 95% by volume of a fluid having a specific gravity greater than that of air based on 100% by volume of the pressurized air,
from 1% to 20% by weight of one or more of fine metals or metal oxide particles, uniformly dispersed in the fluid, based on 100% by weight of the fluid, and
the metal ingredient of the particles being selected from the group consisting of Al, Si, Ca, Ti, Mn, Fe, Co, Ni, Cu, Zn, Pb, Ba, Mg and Mo.

It has been, surprisingly, found that a fluid having a specific gravity greater than that of air charged into the airtight inside of a tire together with a pressurized air can greatly moderate vibrations and shocks exerted during running of a car, improve running stability and performance and, in particular, reduce the braking distance remarkably.

It has not yet been apparent at present why such an unexpected effect can be obtained, but it is assumed to be based on a so-called fly wheel effect caused by the increase of inertia due to increased weight of the tire that functions as a high speed body of rotation. When a fluid of a greater specific gravity than air is charged in a pneumatic tire, the fluid is localized to an inner peripheral circumference of the tire due to a centrifugal force during high speed rotation and a tread surface of the tire is forced more strongly and with increased area of contact onto the road surface, to grip it firmly.

Furthermore, in a conventional pneumatic tire, the inner surface thereof is cooled to some extent by metal components of a car such as a rim by way of a pressurized air charged in the tire. However, since air sealed in the tire has no sufficient cooling performance, the conventional pneumatic tire usually suffers from heat of friction during running or upon braking of a car and is denatured or deformated (abrasion), particularly, in the grooved tread surface, to result in undesired effects such as on the running stability and braking effect.

On the other hand, in the fluid-charged tire according to the present invention, the inner surface thereof is always in contact with the fluid such as water having greater cooling performance by centrifugal force during rotation and, further, the fluid (water) itself is effectively cooled from the outside by way of the metal components. Accordingly, the heated tire can be cooled effectively to be prevented from being thermally denatured or deformed, and always maintain an effective gripping force to the road surface and keep the running stability, braking effect, always constant.

Further although we had initially considered that a fuel cost would naturally be increased more or less due to the increased weight caused by the charging of the fluid, it has, surprisingly, been found that the cost is rather decreased as compared with the case of usual pneumatic tires as far as our experimental running test is concerned.

SECOND FEATURE OF THE INVENTION

Practical usefulness of the fluid-charged tire can be further improved by the second feature of a fluid-charged vehicle tire.

That is, the second feature resides in:

A vehicle tire in which a pressurized air is charged in an air tight inside of a tire, together with
from 10% to 60% by volume of water based on 100% by volume of the pressurized air, and
from 0.2% to 3% by weight of a highly water absorbing polymer, capable of absorbing a great amount of water and swelling into fine spherical and easily fluidizable gel particles, based on 100% by weight of the water.

As the fluid to be charged in the tire in the present invention, liquid is preferred and water is most desirable in view of specific gravity, specific heat calorie, easy availability and, inert chemical nature.

However, tires used, for example, in high latitudes, where atmospheric temperature in winter seasons is often lowered to less than the freezing point (0° C.) of water, it is afraid that water charged in the tire is frozen to make the tire rotation remarkably instable, in particular, upon starting of a car. Although the freezing of water can be prevented to some extent by addition of an appropriate anti-freezing agent, it is more preferred to employ such a fluid as having physical properties just like water but not frozen even under severe cold conditions.

"Highly water absorbing polymer" referred to herein means such polymers as capable of absorbing water from several tens to several hundreds times by volume based on the unit volume of the polymer and irreversibly swelling into gel particles, which have been used recently in various fields of art as water absorbents such as used for construction materials and, disposable diapers.

The highly water absorbing polymers used in the present invention are those capable of rapidly absorbing a great volume of water and forming fine spherical and easily flowable particles substantially comprising water (hereinafter sometimes simply referred to as hydrospheres). As one of typical examples of such polymers, there can be mentioned a group of polysodium acrylates as detailed later. When such a polymer is charged together with water in the plenum of a tire, it forms highly flowable fine spheres which have similar physical properties such as specific gravity to those of water.

In particular, even if the atmospheric temperature is lowered below the freezing point of water, the hydrospheres are kept in the initial individual spherical shape while maintaining the absorbed water therein and free from freezing cohesion to each other.

Accordingly, the tire charged with such hydrospheres can be used with no troubles at all even during severe cold winter seasons in high latitudes.

THIRD FEATURE OF THE INVENTION

The effects of each of the first and the second features in the present invention as described above can further be enhanced by radial undulations along the inner circumferential surface of the tire.

In this improved tire structure having inner radial undulations, running stability and, braking distance, can further be enhanced.

The reason why such an improved effect can be obtained is not always apparent at present, but it is assumed that the radial undulations give a flow resistance to a fluid which flows circumferentially along the inner surface of the tire during rotation and that the fluid is uniformly distributed centrifugally to each of the portions at the inner circumferential surface of the tire and urges the tire tread uniformly and more effectively to a road surface.

DETAILED DESCRIPTION OF THE INVENTION

In the present invention, the fluid charged at the inside of a tire together with pressurized air may, in principle, be in any form of gas, liquid or solid (powder or particle) so long as it has a specific gravity greater than that of air. However, in view of the specific gravity, specific heat calorie, liquid is generally preferred and, more practically, water is most desirable in view of easy availability and chemically inert nature.

The amount of the fluid used relative to the pressurized air charged in the tire is from 5% to 95% by volume of the fluid based on 100% by volume of the pressurized air.

If the amount of the fluid is less than 5% by volume based on 100% by volume of air, aimed effect due to the charging of the fluid can not be obtained substantially. On the other hand, if the amount of the fluid exceeds 95%, usual shock-absorbing effect of pressurized air is deteriorated. A preferred range of the fluid is from 10 to 50% by volume of the fluid based on 100% by volume of the pressurized air from a practical point of view.

In a usual pneumatic tire, pressurized air in the tire is jetted out all at once to the outside upon puncture accidents to abruptly reduce the tire pressure thereby bringing about a dangerous state. However, in the tire according to the present invention, since a considerable portion of the pneumatic pressure in the tire is substituted with that of the fluid, for example, water and, since discharge of water upon puncture is not so rapid, sudden crush of the tire can be avoided.

In a case of using water as the fluid charged to the tire, it is preferred that an anti-freezing agent is mixed into water. Well-known anti-freezing agent miscible with water such as ethylene glycol and glycerine highly can be used preferably.

The amount of the anti-freezing agent, while varying depending on the kind of the agent, ranges about from 5 to 30% by weight based on the weight of water.

Polyethylene glycol and glycerin are exemplified here as the anti-freezing agent, but they may also be used by themselves as a fluid to be charged in the tire.

Further, additives of greater specific gravity may preferably be incorporated into the fluid to be charged.

The additive usable herein are one or more of fine particles of metals selected from the group consisting of Al, Si, Ca, Ti, Mn, Fe, Co, Ni, Cu, Zn, Pb, Ba, Mg and Mo or oxides of such metals. The additives are used within a range from 1 to 20% by weight of the fluid. The additives are uniformly suspended in the fluid for increasing the weight of the fluid and improving the centrifugal and fly-wheel effects.

As has been described above, water is most suitably used in the present invention in view of its specific gravity, specific heat calorie, chemically inert nature, easy handling, and easy availability. However, since the water is frozen at 0° C., there is a fear that water in the tire is often frozen in cold climate conditions. Since water charged in the tire functions as a fluid rotating together with the tire, if water is frozen, for example, during parking of the car, it will be localized to the bottom of the tire periphery and cause unbalanced weight of the tire, to result in severe vibrations or exert uneven stresses to the car or the tire itself.

Although the freezing of water may be avoided by the addition of an anti-freezing agent to water, other effective countermeasure is more desirable in order to completely eliminate the worry of freezing hazard.

In the present invention, a highly water absorbing polymer capable of absorbing a great volume of water e.g. from several tens or several hundreds time by volume of water per unit volume of the polymer and irreversively forming fine spherical and easily flowable particles (hydro-spheres) is used to eliminate the worry of freezing hazard.

Referring more specifically, polysodium acrylates can be mentioned as one of typical examples of the highly water absorbing polymer suitably used in the present invention and they are represented by the general formula: $(CH_2=CHCOONa)_n$. Acutally, the polymer may contain, in addition to Na, 0.4% of potassium, 0.2% of aluminum, 120 mmg/kg of Si and 60 mmg/kg of Ca based on the entire polymer.

Among the polysodium acrylates as described above, particularly preferred are those having a water absorbing performance (deionized water) of about 70 to 300 times by volume of water per unit volume of the polymer, water absorbing rate of from 3 sec to 145 sec, expanding ratio of about 2.5, bulk density of 0.94 and average grain size of 20 to 900 μm.

Actual products of such polysodium acrylate are marketed from Osaka Organic Chemical Ind., Japan, under the trade name of PQ POLYMERS including various grades, for example, as shown in the table below.

TABLE

| | (PQ Polymer) | | | |
|---|---|---|---|---|
| | Average grain size (um) | Grain size after absorption (mm) | Water absorbancy | Absorbing rate (sec) |
| PL-100 | 20–30 | 0.1 | 70–140 | 2.5 |
| BL-100 | 70–140 | 0.3–0.5 | 70–140 | 19 |
| BL-151 | 300–500 | 1.0–2.0 | 70–140 | 144 |
| BL-150 | 900–1100 | 3.0–4.0 | 70–140 | 240 |
| BH-100 | 70–140 | 0.3–0.5 | 300–500 | 17 | note:
Grain size after absorption was measured after absorbing 50 vol. times of water.
Absorbing rate was measured under room temperature.
Particle shape after absorption varied from powder to coarse grains depending on the grade.

In the present invention, water is added in an amount from 10 to 60% by volume based on 100% by volume of the pressurized air. The highly water absorbing polymer is added to the charged water in an amount about from 0.2 to 3% by weight of the water depending on the grade thereof.

If the amount of the polymer is insufficient, water can not completely be absorbed but remains as it is to bring about a worry of water freezing coagulation.

On the other hand, if the amount of the polymer is excessive, the amount of water absorbed in the polymer is relatively insufficient to reduce the water content in the hydro-spheres and, thus, reduce the bulk density (apparent specific gravity), making it difficult to obtain the same effect as that of water.

The polysodium acrylate may be added to water, for example, by charging a predetermined amount of the polymer together with pressurized air into the tire and then introducing a predetermined amount of water in a form of liquid or vapor to form hydro-spheres, charging hydro-spheres formed by previously admixing a predetermined amount of polysodium acrylate with water into a tire by using, for example, a pressurizing pump.

In the present invention, an anti-rust agent and/or a surface active agent may be added to the water.

The anti-rust agent has a function of inhibiting rust which may possibly be formed at metal components in contact with the tire caused by the presence of water in the tire. It is added usually within a range from about 0.1 to 7.5% by weight based on the weight of the water.

The surface active agent has a function of preventing the hydro-spheres from depositing to the inner surface of the tire. It is usually used at a ratio from about 0.1 to 1.5% by weight based on the weight of water.

In a further aspect of the present invention, as described above, radial undulations are formed along the inner circumferential surface of the tire. The radial undulations are formed so that they provide flow resistance to the fluid charged in the tire and uniformly distribute the same to the inner circumferential surface of the tire under a centrifugal force upon high speed rotation.

In this structure, the radial undulations at the inside of the tire are, advantageously, formed to the inner surface of the tire at a position corresponding to the tread portion at the outer surface of the tire, since the fluid is usually localized there by the centrifugal force.

More preferably, the undulations are formed within a lateral area corresponding to the lateral width of a tread formed at the outer circumference of a tire.

There is no particular restriction for the shape of the radial undulations and appropriate shapes can be selected while considering easy of fabrication. For instance, a pattern identical with a grooved pattern usually formed at the tread of the tire surface, a pattern comprising a plurality of independent spots or a pattern comprising a plurality of stripes disposed in perpendicular to the rotating direction of the tire may be used.

The radial height for each of the undulations, that is, the distance between the bottom and the top of the radial undulation somewhat varies depending on the diameter of the tire, kind of the fluid to be charged or like other factor and it ranges preferably from 5 mm to 30 mm.

DESCRIPTION OF THE ACCOMPANYING DRAWINGS

Figure 1:
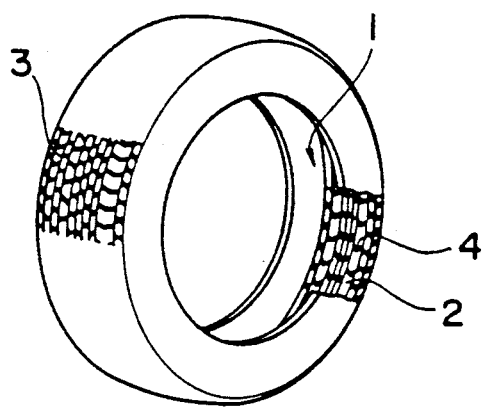
FIG. 1(a) is a schematic explanatory view of a tire according to the present invention illustrating a pattern of radial undulations formed to an inner circumferential surface of a tire.
FIG. 1(b) is a schematic plan view for a portion of the tire shown in FIG. 1(a)
Figure 1:
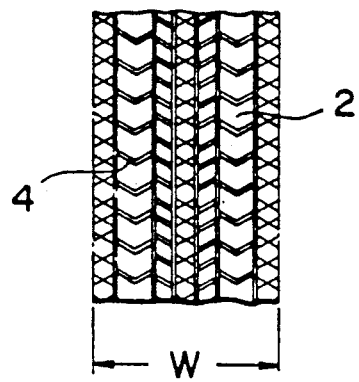
Figure 2:
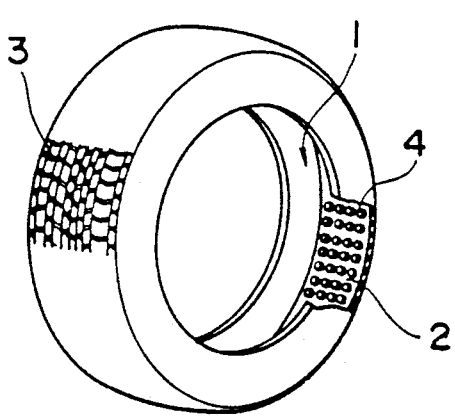
Figure 2:
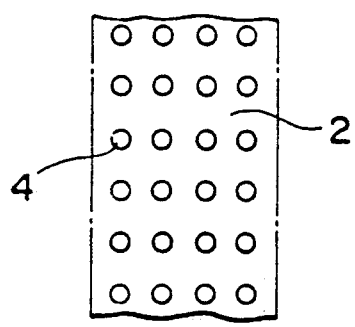
Figure 3:
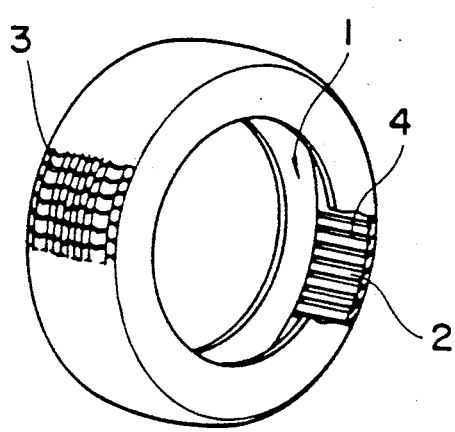
Figure 3:
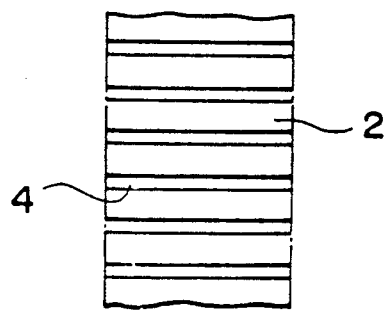

FIG. 2(a) and 2(b) illustrate a modified pattern of the radial undulations corresponding to FIGS. 1(a) and 1(b) respectively; and FIGS. 3(a) and 3(b) illustrate another modified pattern of the radial undulations corresponding to FIGS. 1(a) and 1(b), respectively.

EXAMPLE

The fluid-charged tire of the present invention is to be described in more details referring to examples based on the results of test experiments.

EXAMPLE 1

Basic Example

Well-maintained and conditioned passenger cars (Cedric N 230, manufactured by Nissan, Nos. A, B, C, D and S), were attached with tubeless pneumatic tires charged with a fluid according to the present invention (A–D) and usual tubeless pneumatic tires (S) as a comparison, respectively, and they were used for running test on a test road for confirming the braking effect and the running stability in accordance with customary test methods (Test conditions: weather, fine; temperature, 21° C.; relative humidity, 45%).

Each of the cars was caused to run at various speeds shown in Table 1 and the braking distance was examined, in comparison, between the fluid-charged tires in accordance with the present invention (A-D) and the conventional pneumatic tires (s). Test results are shown in Table 1.

Water was used as the fluid and it was charged into each of the plenum of the tubeless tires (A.B.C. and D) by way of a sealing damper of the tire at each of the volume ratios relative to the volume of pressurized air shown in Table 1 (converted as a volume under 1 atm).

TABLE 1

Test for Braking Distance
Fluid:air (vol. ratio)

| Car speed (km/h) | S (Comparative) 0 | A 1:9 | B 2:8 | C 3:7 | D 5:5 |
|---|---|---|---|---|---|
| | | (tire of the invention) | | | |
| 20 | 9 | 8.5 | 8.1 | 7.8 | 7.2 |
| 30 | 15 | 13.5 | 13.0 | 12.6 | 12.3 |
| 40 | 22 | 19.0 | 18.5 | 18.5 | 17.1 |
| 50 | 32 | 28.5 | 26.5 | 25.3 | 24.0 |
| 60 | 44 | 39.5 | 43.0 | 36.2 | 35.5 |
| 70 | 58 | 45.0 | 43.0 | 41.3 | 39.0 |
| 80 | 76 | 67.0 | 65.6 | 60.2 | 55.7 |
| 90 | 93 | 82.4 | 79.3 | 78.6 | 76.5 |
| 100 | 112 | 98.6 | 95.2 | 91.8 | 90.3 |

As apparent from Table 1, the braking distance was shortened by about 10%, in average, for each of the running speeds in the case of using the tires according to the present invention (A-D) as compared with the case of using the usual pneumatic tires (S). The distance reducing effect was improved along with the increase in the water: air ratio within the range shown in Table 1.

Further, improved anti-vibration effect and steering stability (free from dangerous zig-zag running) were also recognized in the case of using the tires according to the present invention.

These effects were also increased gradually as the car speed was increased after the starting.

The same test was also conducted at each of the water:air ratios of 9:1, 8:2, 7:3 and 6:4 in addition to the ratios shown in Table 1, to obtain similar effects to those in this example.

Using the same passenger cars as described above, running test was conducted for two months for the water-charged tires according to the present invention and the conventional pneumatic tires and average running kilometers per liter of gasoline was examined. Test results are as shown in Table 2 below.

TABLE 2

Average Running Kilometer (km/l (gasoline))

| | A | B | C | D | Average for A-D (S) (km/l) |
|---|---|---|---|---|---|
| Sept., 1988 | 6.81 | 5.55 | 6.10 | 6.13 | 6.14 |
| (May, 1988) | *(5.23) | (5.13) | (4.46) | (5.28) | (5.02) |
| Oct., 1988 | 5.46 | 5.74 | 5.96 | 6.26 | 5.85 |
| (June, 1988) | *(5.59) | (5.41) | (4.48) | (4.98) | (5.11) |
| Average for 2 month | 6.13 | 5.64 | 6.03 | 6.14 | 5.99 |
| | *(5.41) | (5.27) | (4.47) | (5.13) | (5.07) |

Note:
Each of numerical values in ( ) indicates the result for conventional pneumatic tires.

As apparent from Table 2, the average running distance per liter of fuels was increased in the case of using the tire according to the present invention as compared with the case of using the conventional pneumatic tire.

EXAMPLE 2

As shown in FIGS. 1(a) and 1(b), radial undulations 4 were formed to the inner surface 2 of a tubeless tire 1 over the area of lateral width W corresponding to the surface pattern formed on a tread 3 at the surface of the tire 1. The distance between the bottom and the top of each of the undulations 4 was about 15 mm.

The same passenger cars A, B, C, D and S as used in Example 1 were attached with water-charged tires of this example and with usual pneumatic tires respectively and tested for confirming the braking effect and the running stability in accordance with customary test methods in the same ways as in Example 1. Test results are shown in Table 3.

TABLE 3

Test for Braking Distance
Fluid:air (vol. ratio)

| Car speed (km/h) | S (Comparative) 0 | A 1:9 | B 2:8 | C 3:7 | D 5:5 |
|---|---|---|---|---|---|
| | | (tire of the invention) | | | |
| 20 | 9 | 8.3 | 7.8 | 7.6 | 6.9 |
| | | (92.2) | (86.6) | (84.4) | (76.6) |
| 30 | 15 | 13.1 | 12.6 | 12.2 | 12.0 |
| | | (87.3) | (84.0) | (81.3) | (75.0) |
| 40 | 22 | 18.6 | 17.6 | 17.2 | 16.1 |
| | | (84.5) | (80.0) | (78.1) | (73.1) |
| 50 | 32 | 27.6 | 25.5 | 24.4 | 23.3 |
| | | (86.2) | (79.6) | (76.2) | (72.3) |
| 60 | 44 | 38.7 | 39.2 | 35.5 | 34.9 |
| | | (87.9) | (89.0) | (80.6) | (79.3) |
| 70 | 58 | 43.8 | 39.4 | 40.3 | 38.2 |
| | | (75.5) | (67.9) | (69.1) | (65.8) |
| 80 | 76 | 65.2 | 63.2 | 58.8 | 54.1 |
| | | (85.7) | (83.1) | (77.3) | (71.1) |
| 90 | 93 | 80.1 | 78.0 | 76.8 | 74.9 |
| | | (86.1) | (83.8) | (82.5) | (80.5) |
| 100 | 112 | 97.0 | 92.7 | 90.0 | 89.8 |
| | | (86.6) | (82.7) | (80.3) | (80.1) |

*Each of the values in ( ) means a ratio to the comparison assumed as 100.

As apparent from Table 3, the braking distance of the water-charged tires was reduced by about 7 to 20% for each of the running speeds as compared with the comparative pneumatic tires. Further, even compared with the results for the water-charged tires in Example 1 (with no radial undulations) about 3% reduction was recognized.

In other tires of modified undulations shown in FIGS. 2(a), (b) and FIGS. 3(a), (b), similar results with those in Example 2 were also obtained respectively.

Using the same passenger cars (A-D), running test was conducted for two months using the water-charged tires of Example 2 and the conventional pneumatic tires, and average running kilometers per liter of gasoline was determined in the same way as in Example 1. Test results are as shown in Table 4 below.

TABLE 4

Average Running Kilometer (km/l (gasoline))

| | A | B | C | D | Average for A-D (S) (km/l) |
|---|---|---|---|---|---|
| July 1988 | 6.34 | 6.41 | 6.25 | 6.20 | 6.30 |
| (May, 1988) | *(5.23) | (5.13) | (4.46) | (5.28) | (5.02) |
| aug., 1988 | 5.97 | 6.59 | 6.27 | 6.14 | 6.24 |
| (June, 1988) | *(5.59) | (5.41) | (4.48) | (4.98) | (5.11) |
| Average for 2 months | 6.15 | 6.50 | 6.26 | 6.17 | 6.27 |
| | *(5.41) | (5.27) | (4.47) | (5.13) | (5.07) |

Note:
Each of numerical values in ( ) indicates results for comparative pneumatic tires.

As apparent from Table 4, the average running distance per liter of gasoline was increased in the case of using the tires in Example 2 as compared with the case of using the conventional pneumatic tires.

EXAMPLE 3

An aqueous solution was prepared by adding 3 parts by weight of sodium borate as an anti-rust agent and 0.3 parts by weight of polyoxyethylene alkyl ether as a surface active agent to 100 parts by weight (100 g) of a mixture consisting of water containing 60% by volume of ethylene glycol.

Then, when 2 parts by weight of powdery polysodium acrylate (PQ POLYMERS BL-100; trade name of products, manufactured by Osaka Organic Chemical Ind., Japan) was admixed based on 100 parts by weight of the aqueous mixture, the polysodium acrylate powder absorbed all the amount of the aqueous solution and was swollen into substantially transparent and elastic fine spherical particles (hydro-spheres) of about 0.1 mm in average grain size in the total volume of 120 ml. The pH value was 7.8.

The hydro-spheres had a specific gravity (apparent specific gravity) of about 0.95 and had a high fluidity with a an angle of rest of about 60°. When the hydro-spheres were maintained for 24 hours under a low temperature of about $-25°$ C. while standing still or under stirring, no particular change was recognized for the physical property, in particular, flowability of the hydro-spheres. The hydro-spheres could easily be charged into the plenum of the tire by means of a usual fluid pump through an air injection port of the tire.

Then, pressurized air was charged into the plenum of the tire in the same manner by using a customary pressurized air charging method.

When the tire was attached to a rotation tester and rotated at a circumstantial temperature of about 20° C. for about 48 hours at 2000 rpm, no abnormal vibrations, etc. were not recognized as compared with the case of usual pneumatic tire. The tires charged with the hydro-spheres described above were loaded to the passenger cars as described in Examples 1 and 2, and the same running tests were conducted. Then, advantageous effects such as shortening in the braking distance, improvement in the running stability, reduction of fuel cost, can be recognized in the same manner as in the case of the tire charged only with water.

When the tire charged with such hydro-spheres were left under accelerated corrosion conditions at 60 days, neither the deposition of the spheres at the inside of the tire nor the corrosion of metal components was observed.

What is claimed is:

1. A vehicle tire in which pressurized air is charged into an air tight inside portion of a tire, together with
   from 10% to 60% by volume of water based on 100% by volume of said pressurized air, and
   from 0.2% to 3% by weight of a highly water absorbing polymer, capable of absorbing a great amount of water and swelling into fine spherical and easily fluidizable gel particles, based on 100% by weight of the water.

2. A vehicle tree according to claim 1, wherein said highly water absorbing polymer is a polysodium acrylate represented by the general formula: $(CH_2=CHCOONa)_n$.

3. A vehicle tire according to claim 1, wherein from 0.1 to 7.5 parts by weight of an anti-rust agent is added based on 100 parts by weight of water.

4. A vehicle tire according to claim 1, wherein from 0.1 to 1.5 parts by weight of a surface active agent is added based on 100 parts by weight of water.

5. A vehicle tire according to claim 1, wherein from 5% to 30% by weight of an anti-freezing agent is added based on 100% by weight of water charged in the tire.

6. A vehicle tire according to claim 1, wherein radial adulations are formed along an inner circumference of the tire.

* * * * *